United States Patent
Ikawa

(10) Patent No.: US 9,859,782 B2
(45) Date of Patent: Jan. 2, 2018

(54) POWER SUPPLY APPARATUS FOR POWER CONVERTERS

(71) Applicant: TOSHIBA MITSUBISHI-ELECTRIC INDUSTRIAL SYSTEMS CORPORATION, Chuo-ku (JP)

(72) Inventor: Eiichi Ikawa, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 546 days.

(21) Appl. No.: 14/459,439

(22) Filed: Aug. 14, 2014

(65) Prior Publication Data

US 2014/0346872 A1  Nov. 27, 2014

Related U.S. Application Data

(63) Continuation of application No. PCT/JP2012/053552, filed on Feb. 15, 2012.

(51) Int. Cl.
| | |
|---|---|
| *H02M 1/08* | (2006.01) |
| *H02J 4/00* | (2006.01) |
| *H02M 7/48* | (2007.01) |
| *H02M 1/00* | (2006.01) |
| *H02J 3/38* | (2006.01) |

(52) U.S. Cl.
CPC ............... *H02M 1/08* (2013.01); *H02J 4/00* (2013.01); *H02M 7/48* (2013.01); *H02J 3/383* (2013.01); *H02M 2001/0006* (2013.01); *Y02E 10/563* (2013.01); *Y10T 307/367* (2015.04)

(58) Field of Classification Search
CPC ..... H02M 1/08; H02M 7/48; H02J 4/00; H02J 3/383; Y10T 307/367
See application file for complete search history.

(56) References Cited

U.S. PATENT DOCUMENTS

| | | | |
|---|---|---|---|
| 6,169,678 B1 * | 1/2001 | Kondo | H01L 31/02021 323/906 |
| 6,528,977 B2 * | 3/2003 | Arakawa | G05F 1/67 323/282 |
| 2004/0154615 A1 | 8/2004 | Komano et al. | |

FOREIGN PATENT DOCUMENTS

| | | |
|---|---|---|
| JP | 8-9555 A | 1/1996 |
| JP | 8-70533 A | 3/1996 |
| JP | 2001-78363 A | 3/2001 |
| JP | 2003-332603 A | 11/2003 |
| JP | 2004-20122 A | 1/2004 |

(Continued)

OTHER PUBLICATIONS

International Search Report dated Apr. 17, 2012 for PCT/JP2012/053552 filed on Feb. 15, 2012 with English Translation.

(Continued)

*Primary Examiner* — Jared Fureman
*Assistant Examiner* — Rafael Pacheco
(74) *Attorney, Agent, or Firm* — Oblon, McClelland, Maier & Neustadt, L.L.P.

(57) ABSTRACT

There is provided a power supply apparatus for power converters which convert power generated by power generators into power to be supplied to a power system. The power supply apparatus includes a photovoltaic power cell for the power converters, the photovoltaic power cells generating power for supplying power of the power converters.

9 Claims, 3 Drawing Sheets

(56) References Cited

FOREIGN PATENT DOCUMENTS

| | | |
|---|---|---|
| JP | 3609509 B2 | 1/2005 |
| JP | 2006-278858 A | 10/2006 |
| JP | 2010-187030 A | 8/2010 |
| JP | 2013-5704 A | 1/2013 |

OTHER PUBLICATIONS

International Written Opinion dated Apr. 17, 2012 for PCT/JP2012/053552 filed on Feb. 15, 2012.
Japanese Office Action dated Nov. 4, 2015 in Patent Application No. 2013-558628 (with English Translation).

* cited by examiner

POWER SUPPLY APPARATUS FOR POWER CONVERTERS

CROSS REFERENCE TO RELATED APPLICATIONS

This application is a Continuation Application of PCT Application No. PCT/JP2012/053552, filed Feb. 15, 2012, the entire contents of which are incorporated herein by reference.

BACKGROUND OF THE INVENTION

1. Field of the Invention

The present invention relates generally to a power supply apparatus for power converters to supply power to the power converters.

2. Description of the Related Art

In general, it is known that power converters are connected in parallel to obtain a large quantity of power. Also, it is necessary to supply control power to the power converters. Thus, to supply control power to these power converters, wiring for control power supplies is installed, apart from main circuits of the power converters.

However, if the installation points of converters are studded (for example, if the power converters are installed in separate buildings), a power supply line used for wiring for control power supplies becomes long. If the power supply line becomes long, the loss in the power supply line becomes large.

BRIEF SUMMARY OF THE INVENTION

An object of the present invention is to provide a power supply apparatus for power converters, the power supply apparatus being capable of reducing the loss in a power supply line for supplying power to the power converters.

In accordance with an aspect of the present invention, there is provided a power supply apparatus for power converters which convert power generated by power generators into power to be supplied to a power system. The power supply apparatus comprises a photovoltaic power cell for the power converters, the photovoltaic power cells generating power for supplying power of the power converters.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

First Embodiment

Figure 1:
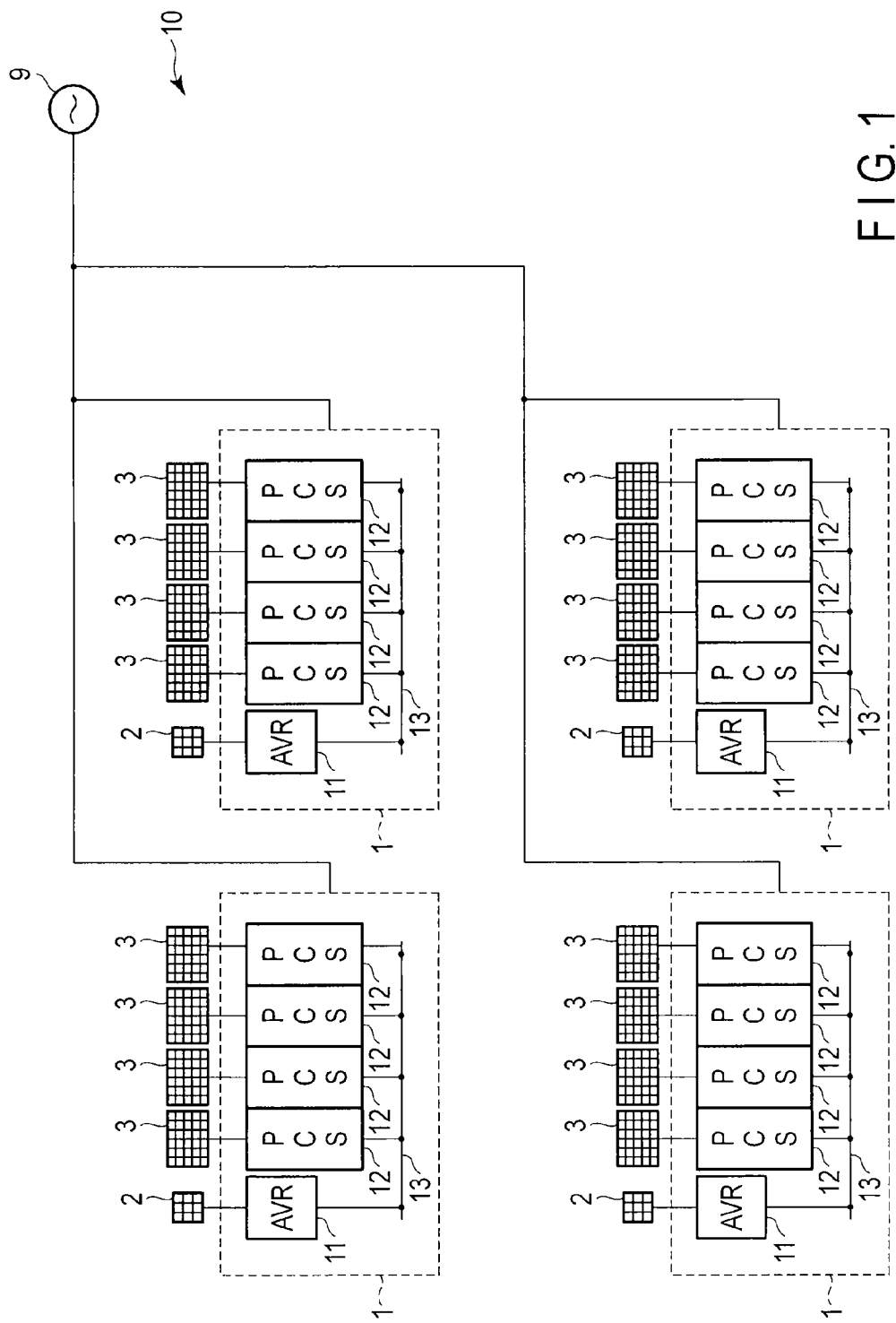
FIG. 1 is a structural view showing a structure of a photovoltaic power generation system according to a first embodiment of the present invention.

FIG. 1 is a structural view of a structure of a photovoltaic power generation system 10 according to a first embodiment of the present invention.

The photovoltaic power generation system 10 includes inverter stations 1, PV arrays 2 for control power supplies provided at the respective inverter stations 1, and photovoltaic (PV) (photovoltaic power cell, solar cell) arrays 3 provided at the respective inverter stations 1. The photovoltaic power generation system 10 interconnects with a grid 9 by power generated by the PV arrays 3.

Each of the inverter stations 1 accommodates an automatic voltage regulator (AVR) 11, power conditioners (power conditioning system [PCS]) 12, and a power supply line 13. Here, wiring on AC sides of the power conditioners 12 is not shown in the figures.

The inverter stations 1 convert direct-current (DC) power generated by the respective groups of PV arrays 3 into alternating-current (AC) power. AC sides of all the inverter stations 1 are connected in parallel. AC power output from all the inverter stations 1 is thereby synthesized. Thus, DC power generated by all the PV arrays 3 in the photovoltaic power generation system 10 is converted into AC power and is supplied to the grid 9.

The PV arrays 3 generate DC power for supplying power to the grid 9. The PV array 3 has a structure in which a number of PV cells are connected in series and in parallel. The PV arrays 3 supply generated power to DC sides of the power conditioners 12.

A PV array 2 for control power supplies generates DC power for supplying control power to all power conditioners 12 in an inverter station 1 where it is installed. The PV array 2 for control power supplies is a PV array having a smaller generation capacity than that of a PV array 3. For example, provided that a generation capacity of each of the PV arrays 3 is 250 kW, that the number of the power conditioners 12 is four, and that each control power of the power conditioners 12 is 100 W, it suffices if the generation capacity of the PV array 2 for control power supplies is about 0.1% of the generation capacity of one of the PV arrays 3.

The AVR 11 converts and conditions a DC voltage supplied from the PV array 2 for control power supplies into an AC voltage to be supplied to the power conditioners 12 as control power. The AVR 11 supplies control power to each of the power conditioners 12 through the power supply line 13.

The power conditioners 12 are provided such that they correspond to the respective PV arrays 3. The power conditioners 12 are power converters convert DC power supplied from the PV arrays 3 into AC power synchronizing with AC power of the grid 9. AC sides of all the power conditioners 12 in the inverter station 1 are connected in parallel. Synthesized output power of the power conditioners 12 connected in parallel is output power of the inverter station 1.

The power supply line 13 is a wire for connecting control power supplies of all the power conditioners 12 in the inverter station 1 in parallel. The power supply line 13 supplies DC power supplied from the AVR 11 to each of the power conditioners 12 as control power.

Figure 2:
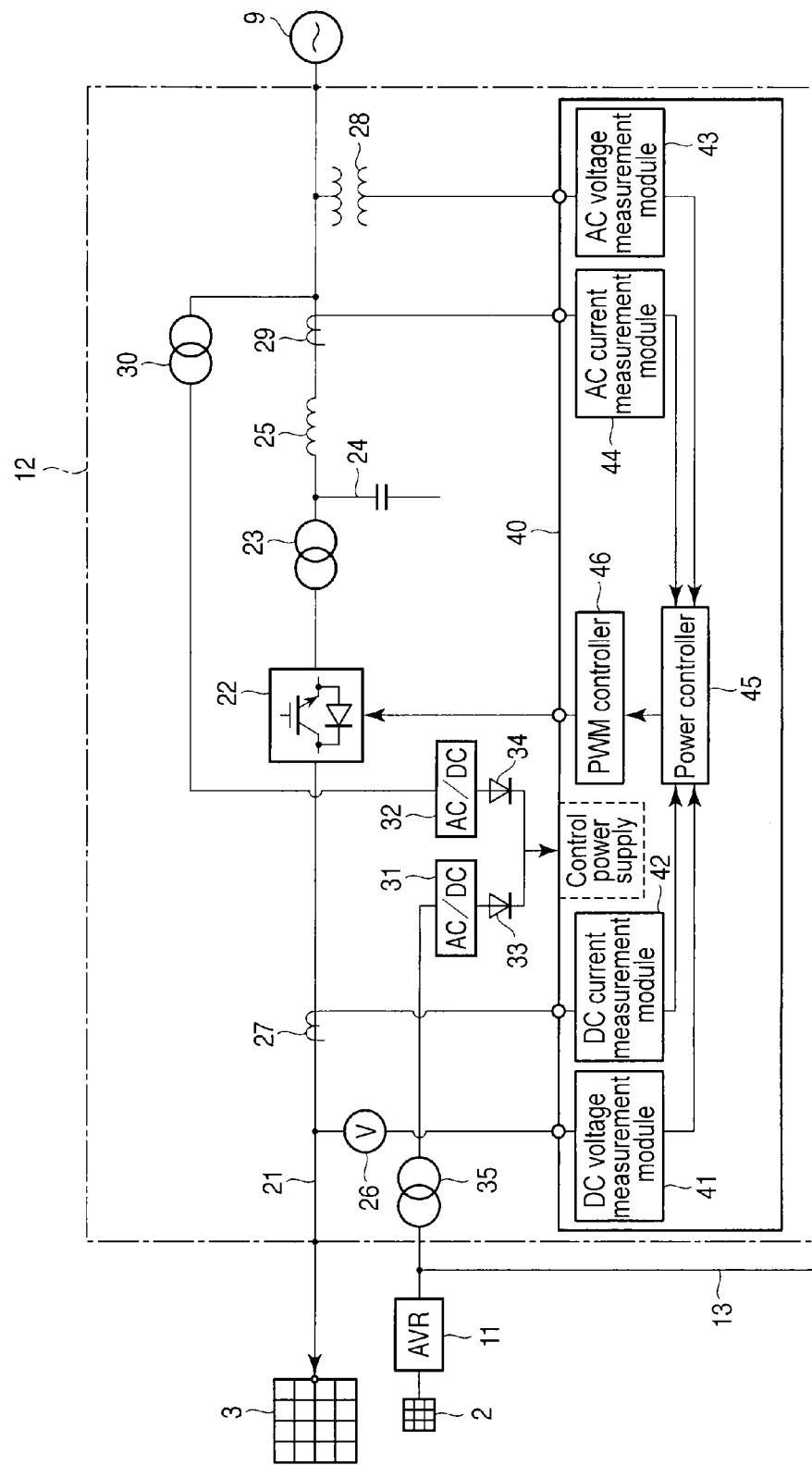
FIG. 2 is a structural view showing a structure of a power conditioner according to the first embodiment.

FIG. 2 is a structural view showing a structure of a power conditioner 12 according to the present embodiment.

The power conditioner 12 includes a power converter (inverter) 22, an interconnection transformer 23, a capacitor 24, a reactor 25, a DC voltage detector 26, a DC current detector 27, an AC voltage detector 28, an AC current detector 29, two transformers 30 and 35 for control power supply, two AC/DC converters 31 and 32 for control power supply, two diodes 33 and 34, and a power conversion controller 40. The two AC/DC converters 31 and 32 for control power supply and the two diodes 33 and 34 may be mounted on a board constituting the power conversion controller 40.

A main circuit 21 is a circuit to supply power generated by a PV array 3 to the grid 9. The main circuit 21 is provided with the power converter 22, the interconnection transformer 23, the capacitor 24, and the reactor 25.

The power converter 22 converts DC power supplied from the PV array 3 into AC power synchronizing with an AC power source of the grid 9. The power converter 22 outputs converted AC power to supply it to the grid 9.

The interconnection transformer 23 is provided at an output side (AC side) of the power converter 22. The interconnection transformer 23 transforms an AC voltage output from the power converter 22 into a voltage to be supplied to the grid 9.

The capacitor 24 and the reactor 25 constitute an AC filter. The AC filter is provided on an AC side of the interconnection transformer 23. The AC filter inhibits a harmonic current flowing from the power converter 22 to the grid 9.

The DC voltage detector 26 is provided on an input side (DC side) of the power converter 22. The DC voltage detector 26 detects a DC voltage input from the PV array 3. The DC voltage detector 26 outputs the detected DC voltage to the power conversion controller 40.

The DC current detector 27 is provided on an input side of the power converter 22. The DC current detector 27 detects a DC current input from the PV array 3. The DC current detector 27 outputs the detected DC current to the power conversion controller 40.

The AC voltage detector 28 is provided on an output side (AC side) of the DC reactor 25. The AC voltage detector 28 detects an AC voltage output from the power converter 22. The AC voltage detector 28 outputs the detected AC voltage to the power conversion controller 40.

The AC current detector 29 is provided on an output side of the DC reactor 25. The AC current detector 29 detects an AC current output from the power converter 22. The AC current detector 29 outputs the detected AC current to the power conversion controller 40.

The transformer 30 for control power supply transforms AC power supplied from the grid 9 into a voltage to be used as control power of the power conversion controller 40 (of the power conditioner 12). AC power transformed by the transformer 30 for control power supply is output to the AC/DC converter 32 for power control.

The AC/DC converter 32 for control power supply converts AC power transformed by the transformer 30 for control power supply into DC power to be supplied as control power of the power conversion controller 40. DC power converted by the AC/DC converter 32 for control power supply is supplied as control power of the power conversion controller 40 through the diode 34.

The transformer 35 for control power supply transforms AC power supplied from the AVR 11 into a voltage to be used as control power of the power conversion controller 40 (of the power conditioner 12). AC power transformed by the transformer 35 for control power supply is output to the AC/DC converter 31 for control power supply.

The AC/DC converter 31 for control power supply converts AC power transformed by the transformer 35 for control power supply into DC power to be supplied as control power of the power conversion controller 40. DC power converted by the AC/DC converter 31 for control power supply is supplied as control power of the power conversion controller 40 through the diode 33.

The two diodes 33 and 34 are connected in parallel. The power conversion controller 40 is thereby supplied with power supplied from at least one of the PV array 2 for control power supplies and the grid 9 as control power.

The power conversion controller 40 is a controller to control the power converter 22. The power conversion controller 40 includes a DC voltage measurement module 41, a DC current measurement module 42, an AC voltage measurement module 43, an AC current measurement module 44, a power controller 45, and a pulse width modulation (PWM) controller 46.

The DC voltage measurement module 41 measures a DC voltage input from the PV array 3 by a DC voltage detected by the DC voltage detector 26. The DC voltage measurement module 41 outputs the measured DC voltage to the power controller 45.

The DC current measurement module 42 measures a DC current input from the PV array 3 by a DC current detected by the DC current detector 27. The DC current measurement module 42 outputs the measured DC current to the power controller 45.

The AC voltage measurement module 43 measures a system voltage of the grid 9 (output voltage of the power converter 22) by an AC voltage detected by the AC voltage detector 28. The AC voltage measurement module 43 outputs the measured AC voltage to the power controller 45.

The AC current measurement module 44 measures an AC current output from the power converter 22 by an AC current detected by the AC current detector 29. The AC current measurement module 44 outputs the measured AC current to the power controller 45.

The power controller 45 performs processing for controlling the electric quantity (current, voltage, power, etc.) to be output from the power converter 22 on the basis of the DC voltage measured by the DC voltage measurement module 41, the DC current measured by the DC current measurement module 42, the AC voltage measured by the AC voltage measurement module 43, and the AC current measured by the AC current measurement module 44. The power controller 45 outputs the calculated electric quantity to the PWM controller 46 as an output command value for the power converter 22.

The PWM controller 46 generates a gate signal for performing PWM control over the power converter 22 on the basis of an output command value input from the power controller 45. The PWM controller 46 performs drive control over the power converter 22 by the generated gate signal.

According to the present embodiment, since the PV arrays 2 for control power supplies are provided at the inverter stations 1 respectively, the power supply lines 13 for connecting control power supplies of the power conditioners 12 in parallel can be accommodated in the inverter stations 1. Thus, even if the power conditioners 12 are distributed among the inverter stations 1, it is unnecessary to install wiring for laying the power supply line 13 between the inverter stations 1. Therefore, because the length of the power supply line 13 can be shortened, the loss in the power supply line 13 can be reduced.

Also, as in the inside of the inverter station 1, the power supply line 13 for the power conditioners 12 can be laid only inside a building. The influence of a lightning surge can be thereby reduced as compared with the case where the power supply line 13 is laid outside.

Moreover, since the PV array 2 for control power supplies is provided aside from the PV arrays 3 for supplying power to the grid 9, power, the quantity of which is suitable for a power supply voltage of the power conditioners 12, can be generated. Also, because the capacity of the AVR 11 can be reduced, the conversion efficiency of the AVR 11 to convert power generated by the PV array 2 for control power supplies can be improved.

Also, by using power of the PV array 2 for control power supplies and power of the grid 9 together and supplying them to the power conditioners 12 as control power supplies, the control power supplies can be used in a duplex system.

Second Embodiment

Figure 3:
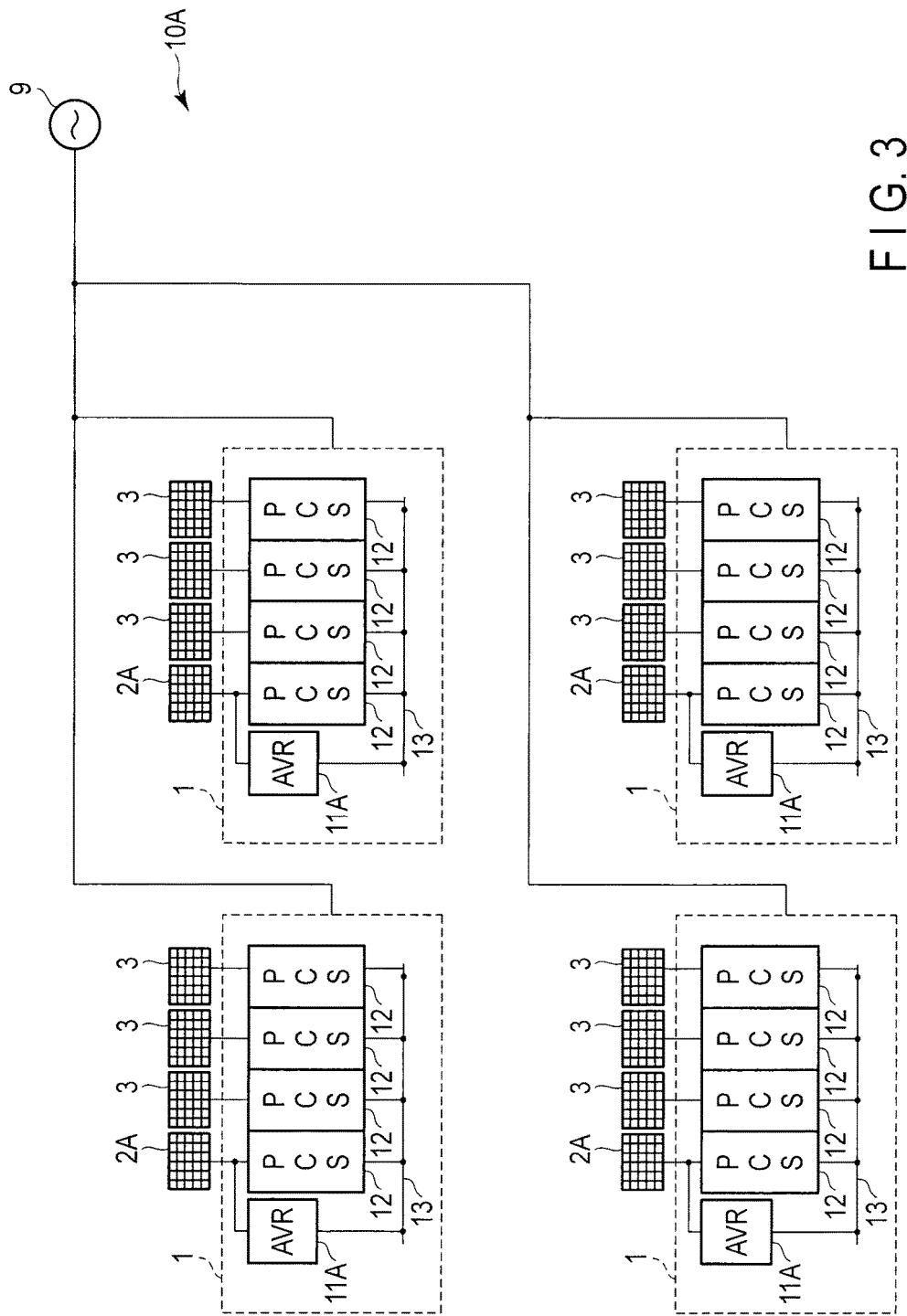
FIG. 3 is a structural view showing a structure of a photovoltaic power generation system according to a second embodiment of the present invention.

FIG. 3 is a structural view showing a structure of a photovoltaic power generation system 10A according to a second embodiment of the present invention.

The photovoltaic power generation system 10A has a structure obtained by providing PV arrays 2A for control power supplies, each of which is used as both one of PV arrays 3 and a PV array 2 for control power supplies, instead of the PV arrays 2 for control power supplies in the photovoltaic power generation system 10 according to the first embodiment shown in FIG. 1. Also, the AVRs 11 are replaced with AVRs 11A. The other points are the same as in the first embodiment.

A PV array 2A for control power supplies is connected to DC sides of main circuits of a power conditioner 12 and an AVR 11A. The PV array 2A for control power supplies generated power to the DC side of the main circuit of the power conditioner 12 and the AVR 11A.

The AVR 11A converts and conditions a larger amount of DC voltage than that of the AVR 11 according to the first embodiment. The other points are the same as those of the AVR 11 according to the first embodiment.

According to the present embodiment, the same operation and effect as those in the first embodiment can be obtained by replacing one of the PV arrays 3 for supplying power to the grid 9 with the PV array 2A for control power supplies, which is used also as a power source for supplying control power of the power conditioners 12.

In addition, in each of the embodiments, the AVR 11 for control power supplies is a converter (DC/DC converter) to convert DC power into DC power, but may be a converter to convert DC power into AC power. Any changes can be made as appropriate in accordance with specifications, etc., of the power conditioners 12.

Moreover, the first embodiment has a structure in which power is supplied to the power conditioners (inverters) 12 used for the photovoltaic power generation system 10, but may be used for power supplies of inverters of a power generation system of a different method. For example, the same operation and effect as those of the first embodiment can be obtained by providing a PV array 2 for control power supplies as control power supplies of inverters used for a windpower generation system. Also, if a power system to be interconnected is a DC power system, it may be used for control power supplies of converters to convert generated power into DC power.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A power supply apparatus for supplying power to a power system, the power supply apparatus comprising:
   a first set of photovoltaic power cells configured to supply power to a power grid;
   a second set of photovoltaic power cells configured to supply a voltage to a voltage regulator to supply control power for controlling power converters; and
   the power converters configured to convert the supplied power and supply the converted power to the power system.

2. The power supply apparatus for the power converters of claim 1, wherein the first set of photovoltaic power cells are power generators in a photovoltaic power generation system.

3. The power supply apparatus for the power converters of claim 1, wherein
   the power converters are distributed among buildings, and
   at least one photovoltaic power cell for the power converters is provided at each of the buildings.

4. A power supply method for supplying power to a power system, the power supply method comprising:
   supplying power by a first set of photovoltaic power cells to a power grid;
   supplying a voltage to a voltage regulator by a second set of photovoltaic power cells to supply control power for controlling power converters;
   converting the supplied power and supplying the converted power to the power system by the power converters.

5. The power supply method for the power converters of claim 4, wherein the first set of photovoltaic power cells are power generators in a photovoltaic power generation system.

6. The power supply method for the power converters of claim 4, wherein
   the power converters are distributed among buildings, and
   power supply to the power converters is performed by power generation of the first set of photovoltaic power cells provided at the buildings where the power converters are provided, respectively.

7. A power generation system comprising:
   a first set of photovoltaic power cells configured to supply power to a power grid;
   power converters configured to convert power supplied by the first of photovoltaic power cells into power to be supplied to a power system; and a second set of photovoltaic power cells configured to supply a voltage to a voltage regulator to supply control power for controlling the power converters.

8. The power generation system of claim 7, wherein the first set of photovoltaic power cells are power generators in a photovoltaic power generation system.

9. The power generation system of claim 7, wherein the power converters are distributed among buildings, and at least one photovoltaic power cell for the power converters is provided at each of the buildings.

* * * * *